(12) United States Patent
Kanehara et al.

(10) Patent No.: US 11,380,192 B2
(45) Date of Patent: Jul. 5, 2022

(54) AUTONOMOUS MOBILE OBJECT AND INFORMATION COLLECTION SYSTEM

(71) Applicant: Toyota Jidosha Kabushiki Kaisha, Toyota (JP)

(72) Inventors: Isao Kanehara, Miyoshi (JP); Kazuhiro Umeda, Nisshin (JP); Hideo Hasegawa, Nagoya (JP); Tsuyoshi Okada, Toyota (JP); Shinjiro Nagasaki, Minato-ku Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 181 days.

(21) Appl. No.: 16/227,709

(22) Filed: Dec. 20, 2018

(65) Prior Publication Data
US 2019/0197886 A1 Jun. 27, 2019

(30) Foreign Application Priority Data
Dec. 26, 2017 (JP) .............................. JP2017-249802

(51) Int. Cl.
*G08G 1/01* (2006.01)
*B60W 40/06* (2012.01)
*G05D 1/00* (2006.01)

(52) U.S. Cl.
CPC ........... *G08G 1/0133* (2013.01); *B60W 40/06* (2013.01); *G05D 1/0088* (2013.01); *G08G 1/0112* (2013.01); *G05D 2201/0207* (2013.01)

(58) Field of Classification Search
CPC ...... G08G 1/0133; G08G 1/00; G08G 1/0125; G08G 1/165; G08G 1/166; B60W 40/06; B60W 60/00; B60K 2370/175; F41H 7/005; B64C 2201/141; G05D 1/0088; G05D 2201/0207; B60G 2400/823; B60G 2800/965; B61L 23/041; B62D 15/0265; B60R 19/483
See application file for complete search history.

(56) References Cited

U.S. PATENT DOCUMENTS

| | | | |
|---|---|---|---|
| 9,878,445 B2* | 1/2018 | Angle | G16H 70/40 |
| 2015/0191119 A1 | 7/2015 | Hikita | |
| 2017/0270375 A1* | 9/2017 | Grauer | G06K 9/6293 |
| 2018/0233042 A1 | 8/2018 | Zhang et al. | |

(Continued)

FOREIGN PATENT DOCUMENTS

| | | |
|---|---|---|
| CN | 1484206 A | 3/2004 |
| CN | 203102592 U | 7/2013 |

(Continued)

*Primary Examiner* — Ig T An
(74) *Attorney, Agent, or Firm* — Dinsmore & Shohl LLP (57) ABSTRACT

An autonomous mobile object includes a sensor unit configured to sense the condition of a road, an operation controller configured to cause the autonomous mobile object to move autonomously on the basis of an operation command, an obtainer configured to obtain surveyed place data, which is information about a surveillance target place and data relating to a method of surveillance associated with each other, and an information collector configured to collect information about the condition of the surveillance target place by the sensor unit when the autonomous mobile object reaches the surveillance target place while travelling on the basis of the operation command.

16 Claims, 10 Drawing Sheets

(56) References Cited

U.S. PATENT DOCUMENTS

| | | | |
|---|---|---|---|
| 2018/0299285 A1 | 10/2018 | Morita | |
| 2018/0319338 A1 | 11/2018 | Hikita | |
| 2019/0140129 A1* | 5/2019 | Valouch | ............ H01L 27/14669 |
| 2020/0004269 A1* | 1/2020 | Oba | ......................... G08G 1/22 |

FOREIGN PATENT DOCUMENTS

| | | |
|---|---|---|
| CN | 104584100 A | 4/2015 |
| CN | 205003867 U | 1/2016 |
| CN | 105849790 A | 8/2016 |
| CN | 107274701 A | 10/2017 |
| JP | 2015-092320 A | 5/2015 |
| JP | 2017-004471 A | 1/2017 |
| WO | 2017111126 A1 | 6/2017 |

\* cited by examiner

SURVEYED PLACE DATA

| ID | SURVEILLANCE TARGET PLACE | SURVEILLANCE METHOD | | |
|---|---|---|---|---|
| | POSITIONAL INFORMATION | SURVEILLANCE TYPE | SENSOR USED | ABNORMALITY CRITERION |
| 1 | NODE E (LATITUDE, LONGITUDE) | SURVEILLANCE OF FLOOD | WATER LEVEL SENSOR | WATER LEVEL HIGHER THAN 20 CM |
| 2 | NODE F (LATITUDE, LONGITUDE) | SURVEILLANCE OF FALLEN ROCK | RADAR | OBSTRUCTION HIGHER THAN 10 CM FROM THE GROUND |
| 3 | ... | SURVEILLANCE OF LANDSLIDE | STEREO CAMERA | COLLAPSE OF ROAD SURFACE LARGER THAN 5 $m^2$ |
| ... | ... | ... | ... | ... |

SURVEYED PLACE DATA

| ID | SURVEILLANCE TARGET PLACE<br>POSITIONAL INFORMATION | SURVEILLANCE CONDITION<br>WEATHER CONDITION | SURVEILLANCE METHOD<br>SURVEILLANCE TYPE | SENSOR USED | ABNORMALITY CRITERION |
|---|---|---|---|---|---|
| 1 | NODE E (LATITUDE, LONGITUDE) | RAINY | SURVEILLANCE OF FLOOD | WATER LEVEL SENSOR | WATER LEVEL HIGHER THAN 20 CM |
| 2 | NODE F (LATITUDE, LONGITUDE) | N/A | SURVEILLANCE OF FALLEN ROCK | RADAR | OBSTRUCTION HIGHER THAN 10 CM FROM THE GROUND |
| 3 | ... | RAINY | SURVEILLANCE OF LANDSLIDE | STEREO CAMERA | COLLAPSE OF ROAD SURFACE LARGER THAN 5 $m^2$ |
| ... | ... | | | ... | ... |

AUTONOMOUS MOBILE OBJECT AND INFORMATION COLLECTION SYSTEM

CROSS REFERENCE TO RELATED APPLICATION

This application claims priority to Japanese Patent Application No. 2017-249802 filed on Dec. 26, 2017 which is hereby incorporated by reference herein in its entirety.

BACKGROUND

Technical Field

The present disclosure relates to a system that collects information using a mobile object.

Description of the Related Art

Various studies have been performed on development of services using mobile objects that can move autonomously. For example, Japanese Patent Application Laid-Open No. 2015-092320 discloses a traffic system for transportation of passengers and/or goods that dispatches autonomous vehicles on users' demand. This patent literature also describes detection of a place of potential road blocking or traffic trouble (such as a road repair, construction work, or obstruction on the road) by means of a camera and communication thereof to other autonomous vehicles.

SUMMARY

When discovering a place of potential road blocking or traffic trouble, the system disclosed in Japanese Patent Application Laid-Open No. 2015-092320 informs other autonomous vehicles of that fact to cause them to make a detour around that place.

While the aforementioned system can detect obstructions or the like using on-vehicle cameras, it cannot perform surveillance focused on specific places where a traffic trouble can occur. For example, places where traffic troubles can occur, such as underpasses, mountainous regions, and vulnerable road shoulders may be surveyed by respective appropriate methods. However, the aforementioned system can detect objects only by the same method. Therefore, the aforementioned system is susceptible to improvement in surveying the condition of roads.

The present disclosure has been made in view of the above circumstances. An object of the present disclosure is to enable collection of information about road conditions using an autonomous mobile object.

An autonomous mobile object according to the present disclosure comprises a sensor unit configured to sense the condition of a road, an operation controller configured to cause the autonomous mobile object to move autonomously on the basis of an operation command, an obtainer configured to obtain surveyed place data, which is information about a surveillance target place and data relating to a method of surveillance associated with each other, and an information collector configured to collect information about the condition of the surveillance target place by the sensor unit when the autonomous mobile object reaches the surveillance target place while travelling on the basis of the operation command.

The autonomous mobile object is a mobile object that moves autonomously on the basis of a certain operation command. The autonomous mobile object may be an autonomous vehicle. The operation command is information including, for example, information about a destination and/or a travel route and information about a service to be provided by the autonomous mobile object on the route. For example, in the case where the autonomous mobile object is intended for transportation of passengers and/or goods, the operation command may be a command that causes the autonomous mobile object to transport passengers and/or goods along a predetermined route. In the case where the autonomous mobile object is intended for transportation of a shop, facility, or equipment, the operation command may be a command that causes the autonomous mobile object to travel to a certain destination, and then prepare the shop, facility, or equipment for service at that place.

The autonomous mobile object obtains the surveyed place data (information about one or more places to be surveyed) and surveys the condition of the road on the basis of the surveyed place data.

The surveyed place data is information about a surveillance target place and data relating to a method of surveillance associated with each other. The surveillance target place may be a place (or point) on the road or a place (or point) of an accessory facility of the road. The data relating to a method of surveillance is information that specifies the method of surveillance the target place. This data may specify, for example, the object of surveillance (e.g. the presence of flooding or fallen rocks), the sensor to be used, and a criterion for determination as to abnormality. The surveyed place data may specify a plurality of surveillance target places.

The autonomous mobile object collects information about the condition of the surveillance target place by the sensor unit when it reaches the surveillance target place while travelling on the basis of the operation command.

With the above configuration, the autonomous mobile object under operation can be caused to survey places where a traffic trouble can occur by methods different from one place to another. This can improve the accuracy of surveillance.

The data relating to a method of surveillance may include a designation of a sensor to be used for sensing of the surveillance target place and a criterion for determination as to whether or not the surveillance target place is in a condition that causes a traffic trouble, and the information collector may be configured to send a notice to a predetermined apparatus when a condition that causes a traffic trouble is found in the surveillance target place.

Including specific information about surveillance in the surveyed place data facilities efficient collection of desired information. The apparatus to which the notice is sent may be a server apparatus that manages the operation of the autonomous vehicle or a server apparatus belonging to an organization that manages the road. Alternatively, the apparatus may be one that provides traffic information to the public.

The autonomous mobile object according to the present disclosure may further comprise an imaging unit configured to capture an image, and the information collector may send an image of the surveillance target place with the notice.

Transmission of an image showing the condition of the surveillance target place can help, for example, a person in charge of management of the road to see the condition of that place in further detail.

The autonomous mobile object according to the present disclosure may further comprise a notifier configured to provide a notice indicating that there is a traffic trouble by a display device, when a condition that causes a traffic trouble is found in the surveillance target place.

For example, a large-size display device provided on the vehicle body may be used to provide a notice indicating that there is a traffic trouble to succeeding vehicles. The notice may be a warning or a notification of the fact that the place is unpassable.

The surveillance target place may be a place where a traffic trouble can occur under a specific weather condition, and the information collector may be configured to collect information about the condition of the surveillance target place when the specific weather condition is met or forecast to be met.

For example, collection of information about places where flooding, landslide, or collapse of the roadbed may be started on condition that the weather condition meets a specific condition. The weather condition may be acquired by a sensor provided on the autonomous mobile object or obtained from an external source through a network.

According to another aspect of the present disclosure, there is provided an information collection system that collects information using an autonomous mobile object that moves autonomously on the basis of an operation command, comprising a first commander configured to send the operation command to the autonomous mobile object, and a second commander configured to send surveyed place data to the autonomous mobile object, the surveyed place data being information about a surveillance target place and data relating to a method of surveillance associated with each other, wherein the autonomous mobile object comprises an information collector configured to collect information about the condition of the surveillance target place when the autonomous mobile object reaches the surveillance target place while travelling on the basis of the operation command.

As above, according to the present disclosure, there is also provided an information collection system including means for sending a command to an autonomous mobile object.

The autonomous mobile object may further comprise a sensor unit configured to sense the condition of the surveillance target place.

The sensor may be any sensor that senses the condition of the road relevant to safe travel of vehicles. Examples of the sensor include, a water level sensor to estimate the state of flooding, a radar or LIDAR for checking obstructions such as fallen rocks or collapse of the road, and a stereo camera for surveying soil on the road brought with flowing water.

A place where a traffic trouble can occur under a specific weather condition may be stored in the second commander as the surveillance target place, and the second commander may send the surveyed place data about that surveillance target place to the autonomous mobile object when the specific weather condition is met or forecast to be met.

As above, relevant surveyed place data may be sent only when the weather condition meets a specific condition.

According to the present disclosure, there can also be provided an information collection system or an autonomous mobile object including at least one or more of the above-described means. According to another aspect of the present disclosure, there is provided a method carried out by the above-described information collection system or the autonomous vehicle. The processing and means described above may be employed in any combinations, as far as it is technically feasible.

As above, the present disclosure enables collection of information about the condition of the road by using autonomous vehicle.

DETAILED DESCRIPTION

First Embodiment

<Outline of the System>

The general configuration of an information collection system according to a first embodiment will be described with reference to FIG. 1. The information collection system according to the first embodiment includes a plurality of autonomous vehicles 100A, 100B, . . . 100n that can run autonomously on the basis of commands given thereto and a server apparatus 200 that sends the commands. The autonomous vehicle 100 is a self-driving vehicle that provides a predetermined service. The server apparatus 200 is an apparatus that performs management of the plurality of autonomous vehicles 100. In the following, the plurality of autonomous vehicles will be collectively referred to as autonomous vehicles 100, when it is not necessary to distinguish individual vehicles.

The autonomous vehicles 100 are multipurpose mobile objects that may individually have different functions and can travel on the road autonomously without a human driver. Examples of the autonomous vehicles 100 include vehicles that travel along a predetermined route to pick up and drop off persons, on-demand taxis that operate on users' demand, and mobile shops that enable shop operation at a desired destination. In the case where the autonomous vehicles 100 are intended for transportation of passengers and/or goods, they may transport passengers and/or goods along a predetermined route. In the case where the autonomous vehicles 100 are intended for transportation of a shop, facility, or equipment, they may travel to a destination, and the shop, facility, or equipment may be prepared for operation at that place. The autonomous vehicles 100 may be vehicles that patrol on the road for the purpose of monitoring facilities and/or infrastructures or preventing crimes. In that case, the autonomous vehicles 100 may be configured to travel along a predetermined patrol route. The autonomous vehicles 100 are also called as electric vehicle palettes (EV palettes).

The autonomous vehicles 100 are not required to be vehicles without humans. For example, a sales staff(s), a customer service attendant(s), or an operation monitoring crew(s) may be on board. The autonomous vehicles 100 are not required to be vehicles that can run completely autonomously. For example, they may be vehicles that can be driven by a human driver or accept a human assistance in some circumstances.

Moreover, the autonomous vehicles 100 have the functions of accepting requests by users, responding to the users, performing appropriate processing in response to the users' requests, and reporting the result of processing to the users. The autonomous vehicles 100 may transfer the requests by users that they cannot fulfil by themselves to the server apparatus 200 so as to fulfil them in cooperation with the server apparatus 200.

The server apparatus 200 is an apparatus that directs the operation of the autonomous vehicles 100. In the case where the autonomous vehicles 100 are on-demand taxis, the server apparatus 200 receives a request by a user to get a location to which an autonomous vehicle 100 is to be dispatched and the user's destination. Then, the server apparatus 200 sends to an autonomous vehicle 100 that is running in the neighborhood of the requested location a command to the effect that the autonomous vehicle 100 is to transport a person(s) from the place of departure to the destination. This command can cause the autonomous vehicle 100 to travel along a certain route. The operation commands are not limited to commands that cause an autonomous vehicle to travel from a place of departure to a destination. Examples of other operation commands may include a command that causes an autonomous vehicle 100 to travel to a determined destination to open a shop at that place and a command that causes an autonomous vehicle 100 to survey streets while traveling along a determined route. As above, operation commands may specify operations to be done by autonomous vehicles 100 besides traveling.

Besides the above-described functions, the server apparatus 200 in the information collection system according to this embodiment has the function of collecting information about the condition of roads on which the autonomous vehicles 100 can run. Specifically, the server apparatus 200 sends a surveillance command to an autonomous vehicle 100 with an operation command. The surveillance command is a command that requires the autonomous vehicle 100 to survey a place to be surveyed (which will be hereinafter referred to as "surveillance target place"). Consequently, the autonomous vehicle 100 collects information when it passes through or by the surveillance target place while performing an operation according to the operation command. The collected information is sent to the server apparatus 200 and used for the purpose of maintenance and management of roads and/or management of operations of the autonomous vehicles 100.

<System Configuration>

In the following, the elements of the system will be described in detail.

Figure 1:
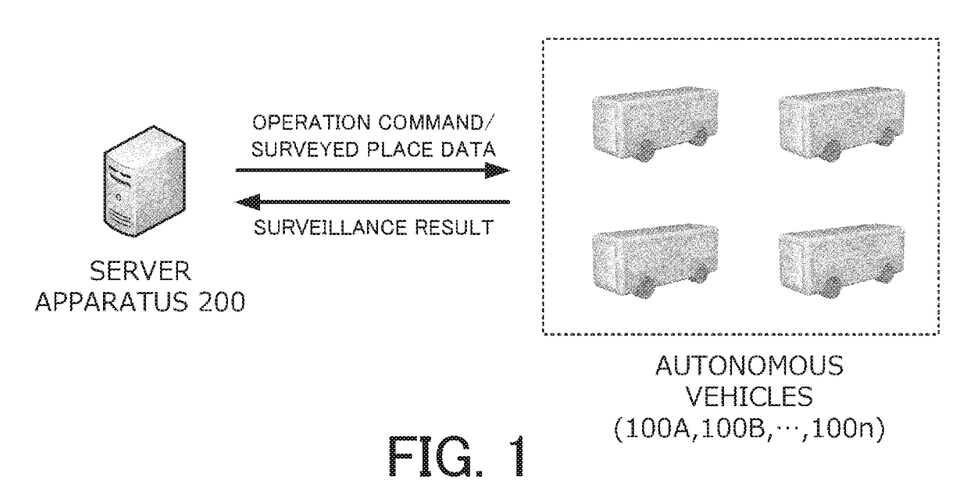
FIG. 1 shows the basic system configuration of an information collection system according to a first embodiment.
Figure 2:
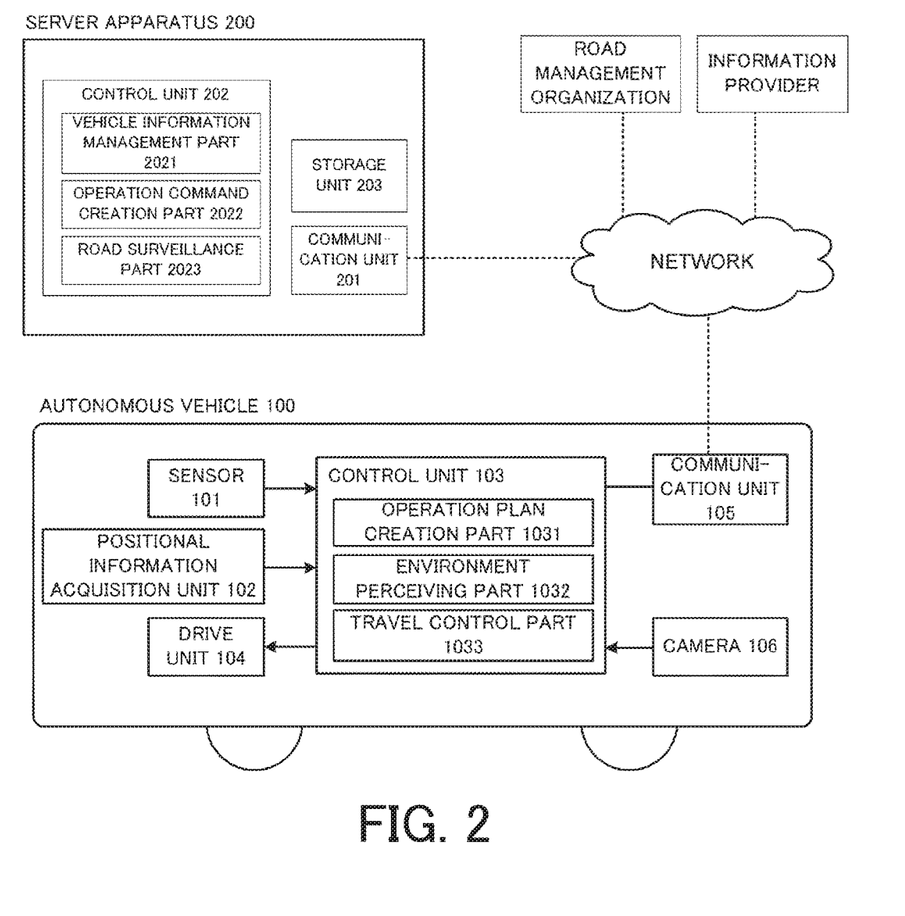
FIG. 2 is a block diagram showing exemplary elements of the information collection system.

FIG. 2 is a block diagram showing an example of the configuration of the autonomous vehicle 100 and the server apparatus 200 shown in FIG. 1. The system may include a plurality of autonomous vehicles 100.

The autonomous vehicle 100 is a vehicle that runs according to an operation command received from the server apparatus 200. Specifically, the autonomous vehicle 100 creates a traveling route on the basis of the operation command received by wireless communication and travels on the road in an appropriate manner while sensing the environment of the vehicle.

The autonomous vehicle 100 has a sensor 101, a positional information acquisition unit 102, a control unit 103, a driving unit 104, and a communication unit 105. The autonomous vehicle 100 operates by electrical power supplied by a battery.

The sensor 101 is means for sensing the environment of the vehicle, which typically includes a stereo camera, a laser scanner, a LIDAR, a radar, or the like. Information acquired by the sensor 101 is sent to the control unit 103.

The sensor 101 includes a sensor(s) used for the purpose of autonomous driving of the autonomous vehicle and a sensor(s) used for the purpose of sensing the condition of roads. Different sensors may be provided for the different purposes. Alternatively, some or all of the sensors may be used for both the purposes.

The positional information acquisition unit 102 is means for acquiring the current position of the vehicle, which typically includes a GPS receiver. Information acquired by the positional information acquisition unit 102 is sent to the control unit 103.

The control unit 103 is a computer that controls the autonomous vehicle 100 on the basis of the information acquired through the sensor 101. The control unit 103 is, for example, a microcomputer.

The control unit 103 includes as functional modules an operation plan creation part 1031, an environment perceiving part 1032, and a travel control part 1033. These functional modules may be implemented by executing programs stored in storage, such as a read only memory (ROM), by a central processing unit (CPU), neither of which is shown in the drawings.

The operation plan creation part 1031 receives an operation command from the server apparatus 200 and creates an operation plan of the vehicle. In this embodiment, the operation plan is data that specifies a route along which the autonomous vehicle 100 is to travel and a task(s) to be done by the autonomous vehicle 100 in a part or the entirety of that route. Examples of data included in the operation plan are as follows.

(1) Data Specifying a Route Along which the Vehicle is to Travel by a Set of Road Links The route along which the vehicle is to travel may be created automatically from a given place of departure and a given destination with reference to map data stored in the storage. Alternatively, the route may be created using an external service.

(2) Data Specifying a Task(s) to be Done by the Vehicle at a Certain Location(s) in the Route Examples of the tasks to be done by the vehicle include, but are not limited to, picking up or dropping off a person(s), loading or unloading goods, opening and closing a mobile shop, and collecting data.

The operation plan created by the operation plan creation part 1031 is sent to the travel control part 1033, which will be described later.

The environment perceiving part 1032 perceives the environment around the vehicle using the data acquired by the sensor 101. What is perceived includes, but is not limited to, the number and the position of lanes, the number and the position of other vehicles present around the vehicle, the number and the position of obstacles (e.g. pedestrians, bicycles, structures, and buildings) present around the vehicle, the structure of the road, and road signs. What is perceived may include anything that is useful for autonomous traveling.

The environment perceiving part 1032 may track a perceived object(s). For example, the environment perceiving part 1032 may calculate the relative speed of the object from the difference between the coordinates of the object determined in a previous step and the current coordinates of the object.

The data relating to the environment acquired by the environment perceiving part 1032 is sent to the travel control part 1033, which will be described below. This data will be hereinafter referred to as "environment data".

The travel control part 1033 controls the traveling of the vehicle on the basis of the operation plan created by the operation plan creation part 1031, the environment data acquired by the environment perceiving part 1032, and the positional information of the vehicle acquired by the positional information acquisition unit 102. For example, the travel control part 1033 causes the vehicle to travel along a predetermined route in such a way that obstacles will not enter a specific safety zone around the vehicle. A known autonomous driving method may be employed to drive the vehicle.

The driving unit 104 is means for driving the autonomous vehicle 100 according to a command issued by the travel control part 1033. The driving unit 104 includes, for example, a motor and inverter for driving wheels, a brake, a steering system, and a secondary battery.

The communication unit 105 serves as communication means for connecting the autonomous vehicle 100 to a network. In this embodiment, the communication unit can communicate with another device (e.g. the server apparatus 200) via a network using a mobile communication service based on e.g. 3G or LTE.

The communication unit 105 may further have communication means for inter-vehicle communication with other autonomous vehicles 100.

Figure 3:
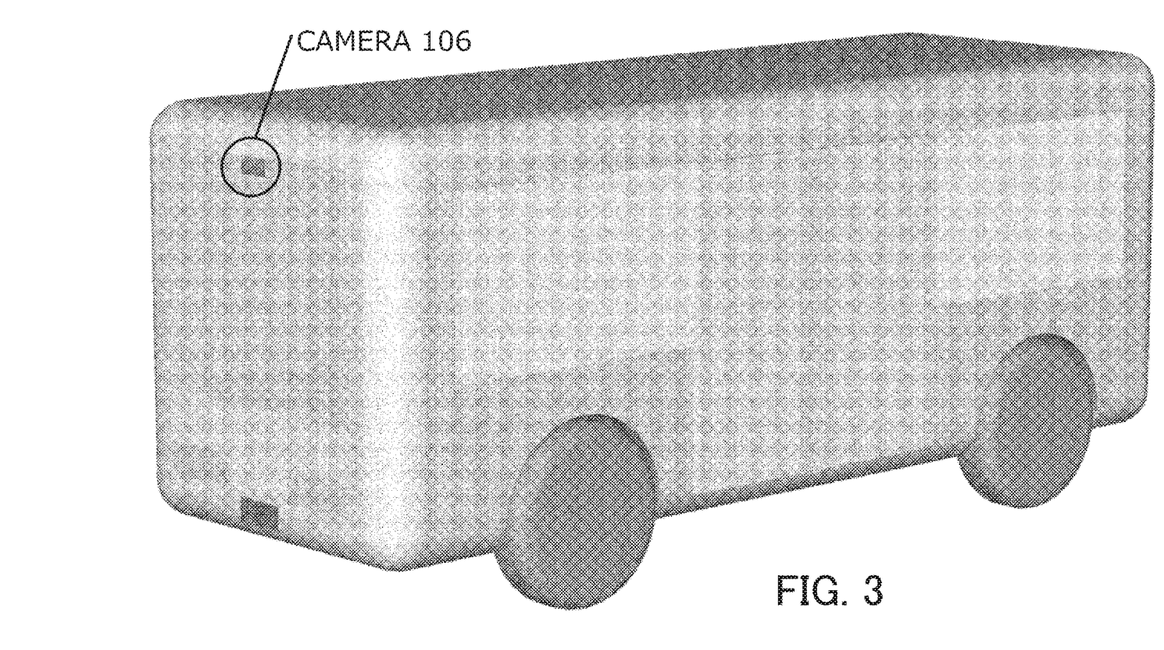
FIG. 3 shows the outer appearance of an autonomous vehicle 100.

The autonomous vehicle 100 has a camera 106 provided on its body. The camera 106 is an imaging device using an image sensor such as a charge-coupled device (CCD), metal oxide semiconductor (MOS), or complementary metal oxide semiconductor (CMOS) sensor. FIG. 3 shows the outer appearance of the autonomous vehicle 100. As shown in FIG. 3, the autonomous vehicle 100 according to this embodiment has the on-vehicle camera 106, which can capture images of the road on which the autonomous vehicle 100 travels. The camera 106 may be any kind of camera that can capture images of the road. While FIG. 3 shows only one camera, the autonomous vehicle 100 may have a plurality of cameras 106 provided on different portions of the vehicle body. For example, cameras may be provided on the front, rear, and right and left sides of the vehicle body.

Now, the server apparatus 200 will be described.

The server apparatus 200 is configured to manage the position of the running autonomous vehicles 100 and send operation commands. For example, in the case where the server apparatus 200 receives from a user a request for dispatch of a taxi, the server apparatus 200 acquires the place of departure and the destination and sends an operation command to an autonomous vehicle 100 that is running in the neighborhood of the place of departure and capable of serving as a taxi.

The server apparatus 200 has a communication unit 201, a control unit 202, and a storage unit 203.

The communication unit 201 is, as with the above-described communication unit 105, a communication interface for communication with autonomous vehicles 100 via a network.

The control unit 202 is means for performing overall control of the server apparatus 200. The control unit 202 is constituted by, for example, a CPU.

The control unit 202 includes as functional modules a vehicle information management part 2021, an operation command creation part 2022, and a road surveillance part 2023. These functional modules may be implemented by executing programs stored in storage, such as a ROM, by the CPU.

The vehicle information management part 2021 manages a plurality of autonomous vehicles 100 that are under its management. Specifically, the vehicle information management part 2021 receives positional information from the plurality of autonomous vehicles 100 at predetermined intervals and stores the information in association with the date and time in the storage unit 203, which will be described later. Moreover, the vehicle information management part 2021 holds and updates data about characteristics of the autonomous vehicles 100, if necessary. This data will be hereinafter referred to as "vehicle information". Examples of the vehicle information include, but are not limited to, the identification of each autonomous vehicle 100, the service type, information about the place at which each vehicle is on standby (e.g. car shed or service office), the door type, the vehicle body size, the carrying capacity, the maximum number of passengers, the full charge driving range, the present (or remaining) driving range, and the present status (such as empty, occupied, running, or under operation etc.).

When a request for dispatch of an autonomous vehicle 100 is received from outside, the operation command creation part 2022 determines the autonomous vehicle 100 to be dispatched and creates an operation command according to the vehicle dispatch request. Examples of the vehicle dispatch request are, but not limited to, as follows.

(1) Request for Transportation of Passengers or Goods

This is a request for transportation of a passenger(s) or goods with designation of a place of departure and a destination or a route to be followed.

(2) Request for Dispatch of an Autonomous Vehicle Having a Specific Function

This is a request for dispatch of an autonomous vehicle 100 that has a specific function, such as the function as a shop (e.g. eating house, sales booth, or showcase), an office of a business entity (e.g. private office or service office), or a public facility (e.g. branch of a city office, library, or clinic). The place to which an autonomous vehicle is to be dispatched may be either a single place or multiple places. In the case of multiple places, service may be provided at each of the places.

(3) Request for Patrol on the Road

This is a request for patrol on the road for the purpose of monitoring facilities and/or infrastructures or preventing crimes.

Vehicle dispatch requests are received from users via, for example, a network. The sender of a vehicle dispatch request is not necessarily an ordinary user. For example, the organization that provides the service with the autonomous vehicles 100 may send a vehicle dispatch request.

The autonomous vehicle 100 to which an operation command is to be sent is determined taking account of the positional information of the vehicles and the vehicle information (indicating what function each vehicle has) that the vehicle information management part 2021 has received.

The road surveillance part 2023 creates a surveillance command to be sent to an autonomous vehicle 100 with an operation command. The surveillance command is a command that causes the autonomous vehicle 100 to survey a place to be surveyed (or surveillance target place) on the road on which the autonomous vehicle 100 can travel.

The surveillance target place is a place that needs to be surveyed periodically for the reason that a trouble that prevents safe travel of vehicles can occur at that place. Examples of the surveillance target place include places that are liable to be flooded, such as places in an area below sea level or underpasses, places where a fall of rock or landslide can occur, such as mountainous regions, and places where an outflow of roadbed can occur.

The server apparatus 200 in the system according to this embodiment has data of surveillance target places and surveillance methods associated with each other in the storage unit 203. This data will also be referred to as "surveyed place data". The road surveillance part 2023 extracts this data on the basis of the positional information of an autonomous vehicles 100 and sends it to the autonomous vehicle 100. The method will be specifically described later.

The term "surveillance target place" used in this specification does not necessarily refer to a single location. For example, the place to be surveyed may extend over the entirety of a certain region (e.g. a certain mountainous region).

The storage unit 203 is means for storing information, which is constituted by a storage medium such as a RAM, a magnetic disc, or a flash memory.

<Operation Based on Operation Command>

Figure 5:
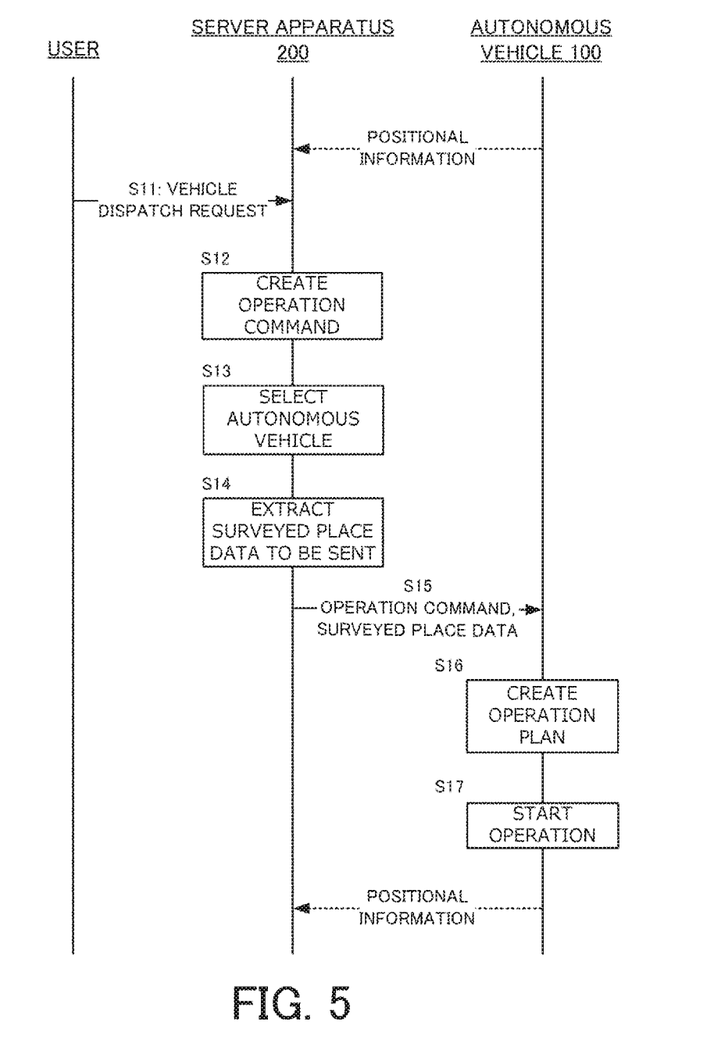
FIG. 5 is a diagram showing dataflow between elements of the system.

Processing that is performed by each of the above-described components will now be described. FIG. 5 is a diagram illustrating dataflow during a process in which the server apparatus 200 creates an operation command based on a request by a user and an autonomous vehicle 100 starts to operate. Here, a case in which the autonomous vehicle 100 runs in a road network shown in FIG. 6 will be described by way of example.

The autonomous vehicle 100 periodically sends positional information to the server apparatus 200. For example, in the case shown in FIG. 6, the autonomous vehicle 100 informs the server apparatus 200 of its location at node A, and the vehicle information management part 2021 stores the association of the autonomous vehicle 100 with node A as data in the storage unit 203. The positional information is not necessarily positional information of a node itself. For example, the positional information may be information that specifies a node or link. A link may be divided into a plurality of sections. The road network is not necessarily a network represented by nodes and links. The positional information is updated every time the autonomous vehicle 100 moves.

If a user sends a vehicle dispatch request to the server apparatus 200 by communication means (step S11), the server apparatus 200 (specifically, the operation command creation part 2022) creates an operation command according to the vehicle dispatch request (step S12). The operation command may designate a place of departure and a destination or only a destination. Alternatively, the operation command may designate a travel route. The operation command may include information about a task to be done or a service to be provided on the route. Here, a case in which a request for transportation of a person from node B to node C is made will be described.

Figure 6:
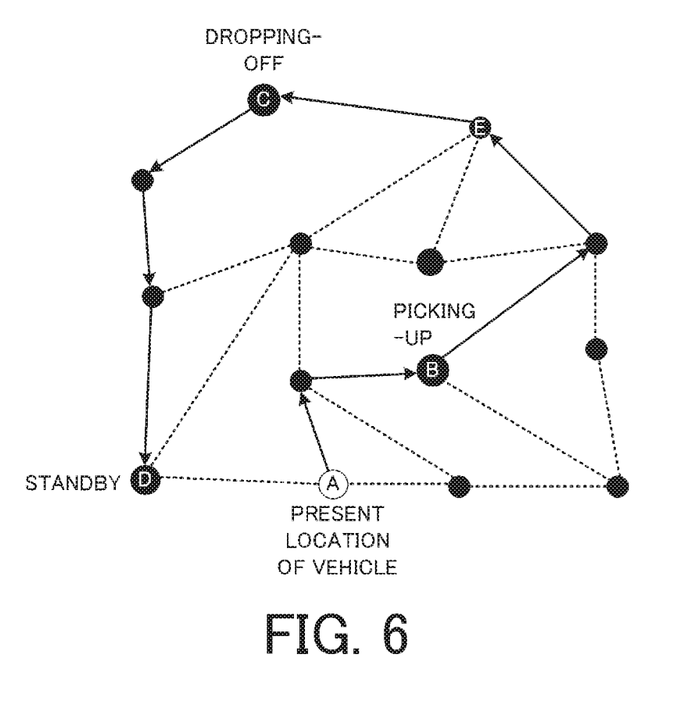
FIG. 6 is a diagram showing an exemplary road network.

In step S13, the operation command creation part 2022 selects an autonomous vehicle 100 that is to provide the service. For example, the operation command creation part 2022 determines an autonomous vehicle 100 that can provide the requested service and can be delivered to the user within a predetermined time, with reference to the stored positional information and vehicle information of the autonomous vehicles 100. Here, let us assume that the vehicle located at node A in FIG. 6 is selected.

Then, in step S14, the road surveillance part 2023 extracts surveyed place data to be sent to the autonomous vehicle 100 selected in step S13. For example, the road surveillance part 2023 conjectures an area in which the selected autonomous vehicle 100 is supposed to travel on the basis of the positional information of that autonomous vehicle 100 or the operation command, extracts a surveillance target place(s) present in that area, and then extracts surveyed place data to be sent to that autonomous vehicle 100. The surveyed place data is data specifying the positional information, a surveillance type, a sensor to be used, and an abnormality criterion for each surveillance target place, as will be seen in the example shown in FIG. 4. If surveillance of an extracted surveillance target place requires a sensor with which the selected autonomous vehicle 100 is not equipped, that surveillance target place may be excluded. Information about the sensors with which the autonomous vehicle 100 is equipped can be obtained from the vehicle information.

In step S15, the server apparatus 200 sends the operation command and the surveyed place data to the selected autonomous vehicle 100.

In step S16, the autonomous vehicle 100 (specifically, the operation plan creation part 1031) creates an operation plan on the basis of the operation command it has received. In the case described here, for example, the autonomous vehicle 100 creates an operation plan to the effect that the autonomous vehicle 100 is to travel along the route indicated by the solid arrows in FIG. 6, pick up and drop off a person at node B and node C respectively, and return to node D.

Figure 4:
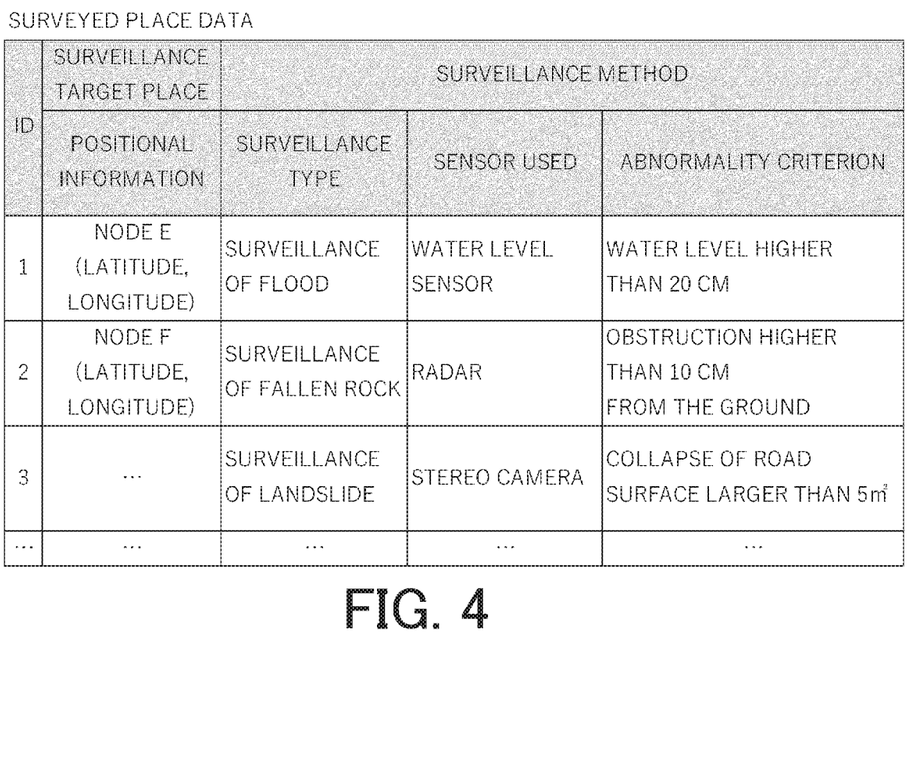
FIG. 4 shows an example of surveyed place data stored in a sever apparatus 200.

Moreover, in cases where the surveillance target places specified in the surveyed place data are present in the route of operation, the operation plan creation part 1031 creates an operation plan to the effect that the autonomous vehicle is to perform sensing of the condition of the road at those places. For example, let us assume that the data of ID=1, 2 in the example shown in FIG. 4 is extracted. In that case, the operation plan creation part 1031 creates an operation plan to the effect that surveillance in terms of the occurrence of flooding is to be performed at node E (e.g. an underpass) by a water level sensor and surveillance in terms of the presence of a fallen rock is to be performed at node F (e.g. a road in a mountainous region) by a radar.

The created operation plan is sent to the travel control part 1033, and then the operation is started (step S17). Positional information is sent to the server apparatus 200 periodically during the operation also.

While in the above-described case the operation command is created on the basis of a vehicle dispatch request sent from an external source (i.e. a user), the operation command does not necessarily have to be created on the basis of a vehicle dispatch request sent from an external source. For example, the server apparatus 200 may create an operation command autonomously. Moreover, the creation of an operation plan does not necessarily have to be based on an operation command. For example, in cases where an autonomous vehicle 100 is to perform patrol for the purpose of surveying streets, the autonomous vehicle 100 may create an operation plan without receiving external instructions. Alternatively, an operation plan may be created by the server apparatus 200.

In the case where the server apparatus 200 is not configured to create operation commands, the surveyed place data may be stored in the autonomous vehicles 100 in an appropriate manner.

<Process Performed in the Neighborhood of Surveillance Target Places>

Figure 7:
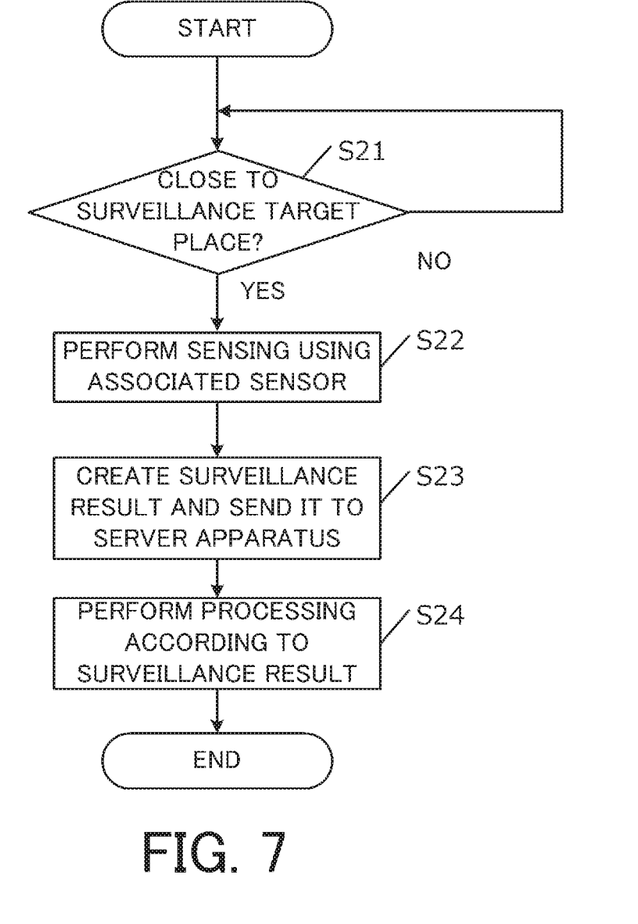
FIG. 7 is a flow chart of a process performed by the autonomous vehicle 100.

Now, the operation of the system in a case where an autonomous vehicle 100 under operation comes close to a surveillance target place will be described with reference to FIG. 7. The processing of steps S21 to S23 in FIG. 7 is performed by the autonomous vehicle 100, and the processing of step S24 is performed by the server apparatus 200.

Firstly in step S21, it is determined whether or not the autonomous vehicle 100 is located close to a surveillance target place specified in the surveyed place data. In this case, a determination is made as to closeness to the surveillance target place. In cases where the target of surveillance is not a single location but a block, it may be determined whether or not the autonomous vehicle has entered that block.

Then, in step S22, sensing of the condition of the road is performed by a sensor associated with the surveillance target place. When sensing is performed in step S22, an image(s) of the surveillance target place on the road may be capture by the camera 106 at the same time.

Then in step S23, a surveillance result is created on the basis of the result of sensing. Specifically, data obtained by sensing is compared with the abnormality criterion specified in the surveyed place data to determine whether the obtained data meets the criterion. If the data obtained by sensing meets the abnormality criterion, a surveillance result indicating that there is a traffic trouble is created. On the other hand, if the data obtained by sensing does not meet the abnormality criterion, a surveillance result indicating that there is no traffic trouble is created. The surveillance result thus created is sent to the server apparatus 200.

In the case where image capturing by the camera 106 is performed in step S22, the captured image(s) may be annexed to the surveillance result.

In step S24, the server apparatus 200 (specifically, the road surveillance part 2023) performs predetermined processing according to the surveillance result it has received.

For example, in the case where the surveillance result received indicates that there is a traffic trouble at a certain place, the server apparatus 200 may notify a server apparatus of a road management organization in charge of management of that place (e.g. an expressway company, a national highway office, or a road management department of a local government) or a server apparatus of an information provider (e.g. an organization that provides traffic information) of that fact. This enables prompt actions to be taken at that place and drivers to be informed of the traffic trouble promptly.

While in the above-described case information is collected by only one autonomous vehicle 100, information collection may be performed by a plurality of autonomous vehicles 100. For example, in cases where the server apparatus 200 receives information indicating that there is a traffic trouble at a certain place, another autonomous vehicle (s) 100 may be caused to check the condition of that place. Specifically, the server apparatus 200 may create and send to another autonomous vehicle(s) 100 an operation command to the effect that the autonomous vehicle 100 should perform sensing of the condition of that place. In this mode, sensing is performed by a plurality of autonomous vehicles 100, leading to improved reliability. In cases where an image of the place in question is not available, the server apparatus 200 may create and sends to another autonomous vehicle(s) 100 running in the neighborhood of that place an operation command to the effect that the autonomous vehicle 100 should capture an image(s) of that place by a camera. An image(s) (still or moving image) captured in this way may be presented to an operator for view.

Results of sensing by a plurality of autonomous vehicles 100 may be combined to enable the server apparatus 200 to make a final judgement as to the presence of a traffic trouble.

As above, in the system according to the first embodiment, the server apparatus 200 holds information about places on the road that need to be surveyed and the methods of surveying those places (e.g. sensor to be used, abnormality criterion, and threshold) in association with each other and sends the information to autonomous vehicles 100 that matches a certain condition. The system of this mode can perform surveillance of the road by an appropriate method suitable for the type and status of the place to be surveyed.

Second Embodiment

In the first embodiment, the server apparatus 200 unconditionally sends data for surveying a surveillance target place to an autonomous vehicle 100 that is supposed to pass through or by that surveillance target place. In the second embodiment, the server apparatus 200 sends surveyed place data on condition that the weather condition at the surveillance target place matches or forecast to match a predetermined condition.

Figure 8A:
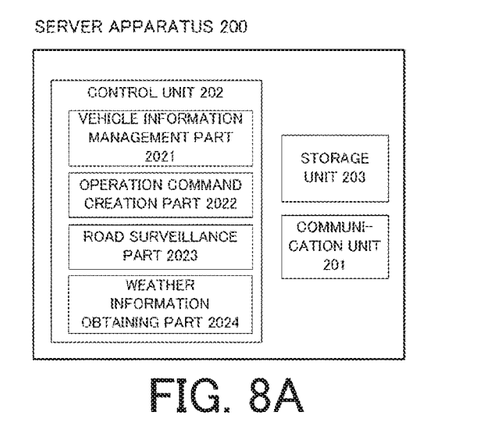
FIG. 8A is a diagram showing the configurations of the server apparatus 200 according to other embodiments.

FIG. 8A is a block diagram showing the configuration of the server apparatus 200 according to the second embodiment. In the second embodiment, the control unit 202 of the server apparatus 200 includes a weather information obtaining part 2024.

The weather information obtaining part 2024 communicates with an external service that provides weather information to obtain weather data (e.g. precipitation and wind speed) at the surveillance target places specified in the surveyed place data. The weather data may be either data at the present time or forecast data. Alternatively, the weather data may be acquired by sensing by an autonomous vehicle 100.

Figure 9:
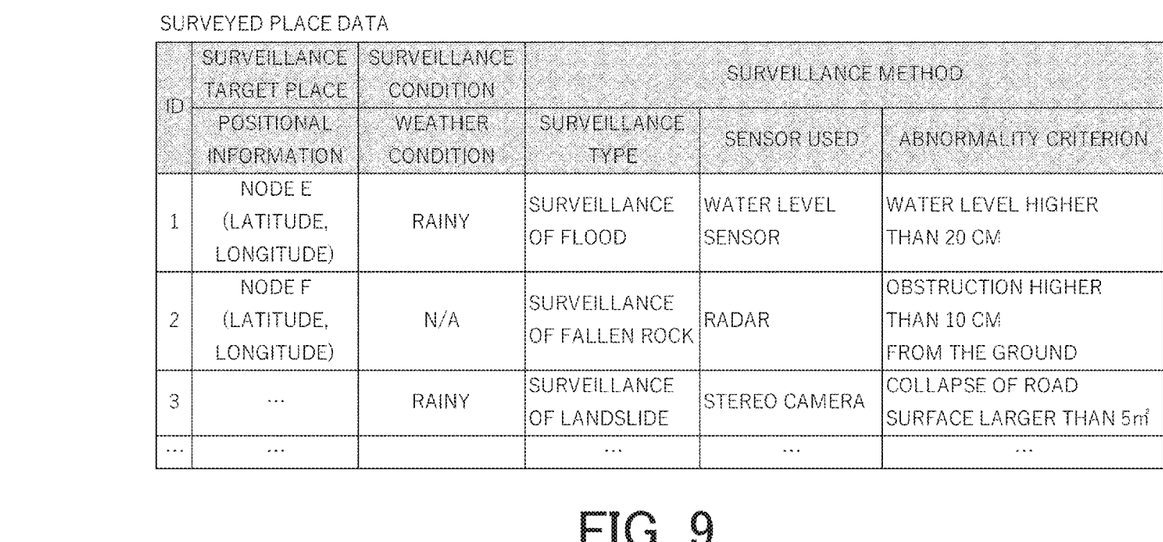
FIG. 9 shows an example of surveyed place data according to second and third embodiments.

In the second embodiment, as shown in FIG. 9, each surveillance target place has an associated weather condition. For example, an exemplary data shown in FIG. 9 specifies that surveillance of flooding and landslide should be performed only when it is raining.

In the second embodiment, when extracting surveyed place data in step S14 (described in the first embodiment), the weather information obtaining part 2024 obtains weather data of each of the surveillance target places and determines whether or not the weather data matches the specified weather condition. This determination may be made using either weather data at the present time or forecast weather data. In the case where forecast weather data is used, the time at which the autonomous vehicle 100 is supposed to pass by the surveillance target place may be considered. In the case where the weather data at a surveillance target place matches the weather condition, surveyed place data of that surveillance target place is extracted. In the case where the weather data at a surveillance target place does not match the weather condition, that surveillance target place is skipped.

As above, in the second embodiment, whether or not to perform surveillance of the road by the autonomous vehicle 100 is determined according to the weather condition. In consequence, the autonomous vehicle 100 is caused to perform surveillance only in circumstances where surveillance is necessary.

Third Embodiment

While in the second embodiment the determination relating to the weather condition is made by the server apparatus 200, in the third embodiment the determination relating to the weather condition is made by the autonomous vehicle 100.

Figure 8B:
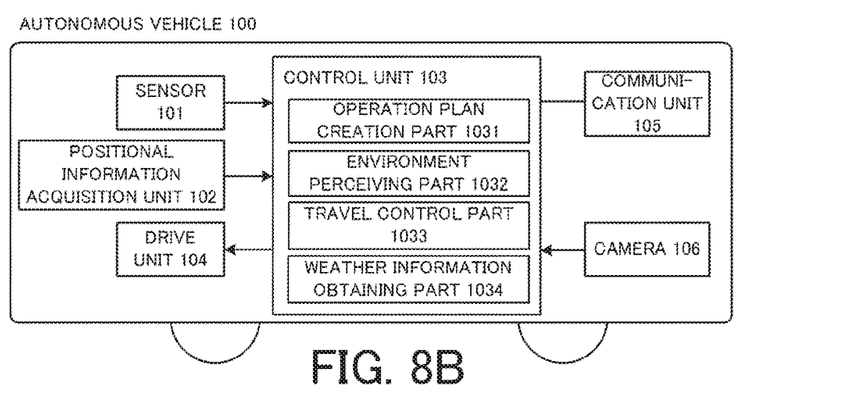
FIG. 8B is a diagram showing the configurations of the autonomous vehicle 100 according to other embodiments.

FIG. 8B is a block diagram showing the configuration of the autonomous vehicle 100 according to the third embodiment. In the third embodiment, the control unit 103 of the autonomous vehicle 100 includes a weather information obtaining part 1034.

The weather information obtaining part 1034 obtains weather data at the surveillance target places specified in the surveyed place data, as with the weather information obtaining part 2024 in the second embodiment. The weather data may be obtained by using an external service.

In the third embodiment, when creating an operation plan after obtaining surveyed place data, the autonomous vehicle 100 obtains weather data at each of the surveillance target places and determines whether or not the weather data matches the specified weather condition. In the case where the weather data at a surveillance target place matches the weather condition, the autonomous vehicle 100 creates an operation plan including surveillance of that surveillance target place. In the case where the weather data at a surveillance target place does not match the weather condition, that surveillance target place is skipped.

While in the above described case the determination is made before starting the operation, the determination as to whether or not to perform surveillance may be made after the arrival of the autonomous vehicle 100 at the surveillance target place. For example, in cases where the sensor 101 includes one that senses weather, weather data at the surveillance target place may be obtained by using that sensor.

Information indicating that surveillance has not been performed because of the unmatched weather condition may be included in the surveillance result sent to the server apparatus 200 in step S23 (described in the first embodiment).

Fourth Embodiment

In the first to third embodiments, when finding a traffic trouble at a surveillance target place, the autonomous vehicle 100 sends a notice about that fact only to the server apparatus 200. In the fourth embodiment, the autonomous vehicle 100 further provides a notice to people around the site of the traffic trouble.

Figure 8C:
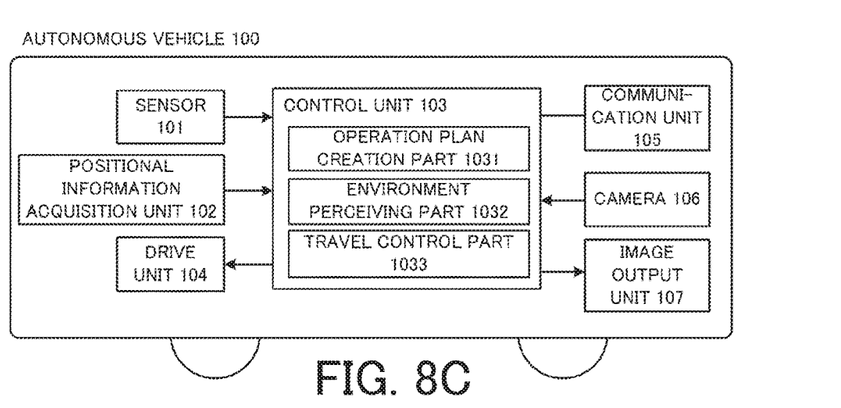
FIG. 8C is a diagram showing the configurations of the autonomous vehicle 100 according to other embodiments.

FIG. 8C is a block diagram showing the configuration of the autonomous vehicle 100 according to the fourth embodiment. The autonomous vehicle 100 according to the fourth embodiment has an image output unit 107.

Figure 10:
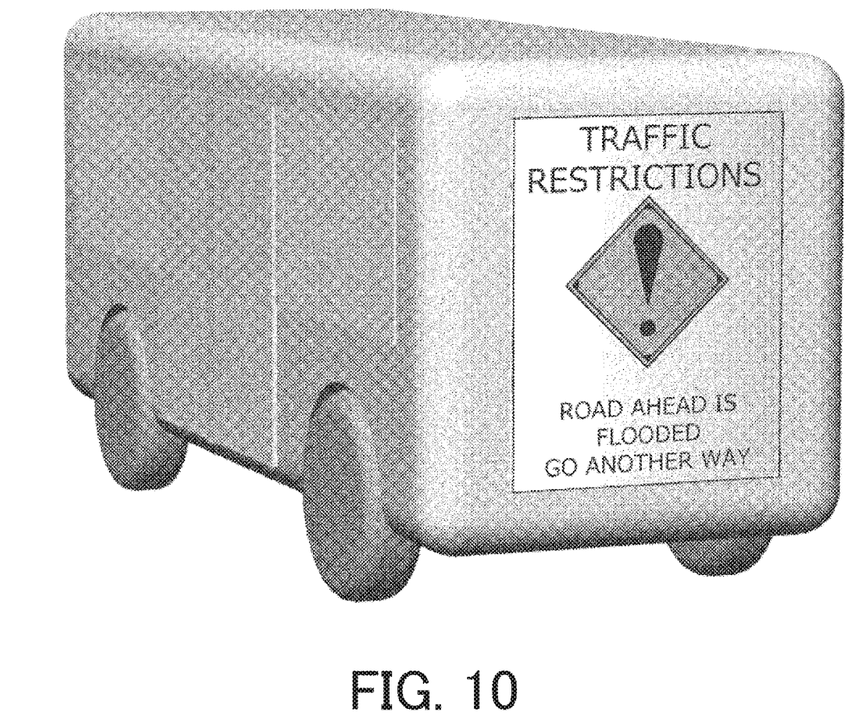
FIG. 10 shows an exemplary image output on a display device in a fourth embodiment.

The image output unit 107 is means for outputting images on an outside display provided on the vehicle body. FIG. 10 shows an exemplary outer appearance of the autonomous vehicle 100 according to the fourth embodiment. As shown in FIG. 10, the autonomous vehicle 100 according to this embodiment has a plurality of displays provided on the outside of the vehicle body, onto which images can be output. The outside displays may be liquid crystal displays or displays composed of LED matrices.

In the fourth embodiment, when it is judged that a surveillance target place is unpassable (or the passage through that place is dangerous), the autonomous vehicle 100 provides a notice through the image output unit 107. For example, the autonomous vehicle 100 outputs an image shown in FIG. 10 to thereby prevent other vehicles from entering that place. Thus, further accidents can be prevented from occurring.

The output of the image of notice may be performed automatically by the autonomous vehicle 100 in step S23 (described in the first embodiment) or by manual remote control by an operator of the server apparatus 200 who has checked the surveillance result in step S24 (described in the first embodiment).

(Modification)

The above embodiments have been described merely as illustrative examples, to which various modifications can be made without departing from the essence of the present disclosure.

For example, while in the above-described embodiments, the autonomous vehicle 100 is configured to automatically perform sensing when passing by a surveillance target place, a moving image captured by the camera 106 may be relayed to the server apparatus 200 on a real-time basis. Moreover, the autonomous vehicle 100 may be configured to allow remote control. For example, remote control of image capturing, monitoring, and/or adjustment of the position and angle of the camera enables more refined operation.

While in the above-described embodiments, information about the predetermined surveillance target places is stored in the server apparatus 200 in advance, surveillance target places may be determined automatically. For example, the server apparatus 200 may automatically determine places where a traffic trouble can occur on the basis of map information (e.g. a road map or a topographic map) stored therein and add them to the list of the surveillance target places. The server apparatus 200 may hold data used to make this determination beforehand.

What is claimed is:

1. An autonomous mobile object comprising:
one or more sensor units configured to sense a condition of a road;
an operation controller configured to cause the autonomous mobile object to move autonomously on the basis of an operation command;
an obtainer configured to obtain surveyed place data from a server, the surveyed place data including information about a surveillance target place, an object of surveillance, and a designation of a sensor unit to be used for sensing the surveillance target place among the one or more sensor units and information about another surveillance target place, another object of surveillance and a designation of another sensor unit associated with the another surveillance target place; and
an information collector configured to collect information about the condition of the surveillance target place by the sensor unit designated in the surveyed place data when the autonomous mobile object reaches the surveillance target place while travelling on the basis of the operation command and collect information about the condition of the another surveillance target place by the another sensor unit designated in the surveyed place data when the autonomous mobile object reaches the another surveillance target place while travelling on the basis of the operation command,
wherein the surveyed place data includes abnormality criterion associated with the object of surveillance, and
the information collector determines whether the information about the condition of the surveillance target place meets the abnormality criterion.

2. The autonomous mobile object according to claim 1, wherein
the surveyed place data includes a criterion for determination as to whether or not the surveillance target place is in a condition that causes a traffic trouble, and the information collector sends a notice to a predetermined apparatus when a condition that causes a traffic trouble is found in the surveillance target place.

3. The autonomous mobile object according to claim 2, further comprising
an imaging unit configured to capture an image,
wherein the information collector sends an image of the surveillance target place with the notice.

4. The autonomous mobile object according to claim 1, further comprising
a notifier configured to provide a notice indicating that there is a traffic trouble by a display device, when a condition that causes a traffic trouble is found in the surveillance target place.

5. The autonomous mobile object according to claim 1, wherein
the surveillance target place is a place where a traffic trouble can occur under a specific weather condition, and
the information collector collects information about the condition of the surveillance target place when the specific weather condition is met or forecast to be met.

6. An information collection system that collects information using an autonomous mobile object that moves autonomously on the basis of an operation command, comprising:
a first commander configured to send the operation command to the autonomous mobile object; and
a second commander configured to send surveyed place data to the autonomous mobile object, the surveyed place data including information about a surveillance target place, an object of surveillance, and a designation of a sensor unit to be used for sensing the surveillance target place and information about another surveillance target place, another object of surveillance, and a designation of another sensor unit associated with the another surveillance target place,
wherein the autonomous mobile object comprises one or more sensor units and an information collector configured to collect information about a condition of the surveillance target place by the sensor unit designated in the surveyed place data when the autonomous mobile object reaches the surveillance target place while travelling on the basis of the operation command and collect information about the condition of the another surveillance target place by the another sensor unit designated in the surveyed place data when the autonomous mobile object reaches the another surveillance target place while travelling on the basis of the operation command,
wherein the surveyed place data includes abnormality criterion associated with the object of surveillance, and
the autonomous mobile object determines whether the information about the condition of the surveillance target place meets the abnormality criterion.

7. The information collection system according to claim 6, wherein
the surveyed place data includes a criterion for determination as to whether or not the surveillance target place is in a condition that causes a traffic trouble, and
the information collector sends a notice to a predetermined apparatus when a condition that causes a traffic trouble is found.

8. The information collection system according to claim 7, wherein
the autonomous mobile object further comprises an imaging unit configured to capture an image, and the information collector sends an image of the surveillance target place with the notice.

9. The information collection system according to claim 6, wherein
the autonomous mobile object further comprises a notifier configured to provide a notice indicating that there is a traffic trouble by a display device, when a condition that causes a traffic trouble is found in the surveillance target place.

10. The information collection system according to claim 6, wherein
a place where a traffic trouble can occur under a specific weather condition is stored in the second commander as the surveillance target place, and the second commander sends the surveyed place data about that surveillance target place to the autonomous mobile object when the specific weather condition is met or forecast to be met.

11. The information collection system according to claim 6, wherein
the surveillance target place is a place where a traffic trouble can occur under a specific weather condition, and the information collector collects information about the condition of the surveillance target place when the specific weather condition is met or forecast to be met.

12. The information collection system according to claim 6, further comprising:
a control unit configured to:
determine whether the autonomous mobile object includes the sensor unit to be used for sensing the surveillance target place; and
in response to determination that the autonomous mobile object does not include the sensor unit to be used for sensing the surveillance target place, exclude the surveillance target place from the surveyed place data.

13. The autonomous mobile object according to claim 1, wherein the object of surveillance is one of surveillance of flood, surveillance of fallen rock, and surveillance of landslide.

14. The autonomous mobile object according to claim 1, wherein the sensor unit is one of a water level sensor, a radar sensor, and a stereo camera, and the another sensor unit is different from the sensor unit.

15. The information collection system according to claim 6, wherein the object of surveillance is one of surveillance of flood, surveillance of fallen rock, and surveillance of landslide.

16. The information collection system according to claim 6, wherein the sensor unit is one of a water level sensor, a radar sensor, and a stereo camera, and the another sensor unit is different from the sensor unit.

* * * * *